(12) United States Patent
Theimer

(10) Patent No.: US 6,298,304 B1
(45) Date of Patent: Oct. 2, 2001

(54) LOCAL NAVIGATION ALTERNATIVES

(75) Inventor: Wolfgang Theimer, Bochum (DE)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/268,580

(22) Filed: Mar. 15, 1999

(30) Foreign Application Priority Data

Mar. 18, 1998 (GB) ................................. 9805795

(51) Int. Cl.[7] ............................................. G01C 21/20
(52) U.S. Cl. .................... 701/210; 701/207; 701/208; 701/209; 701/213
(58) Field of Search .................. 701/200, 207–212, 701/213–223; 342/357.01–357.17; 455/403, 414, 422–460, 466

(56) References Cited

U.S. PATENT DOCUMENTS

| 4,992,947 | * | 2/1991 | Nimura et al. ................. 701/210 |
| 5,608,635 | | 3/1997 | Tamai . |
| 5,610,821 | | 3/1997 | Gazis et al. . |
| 5,638,280 | | 6/1997 | Nishimura et al. . |
| 5,652,706 | | 7/1997 | Morimoto et al. . |
| 5,675,492 | | 10/1997 | Tsuyuki . |
| 5,757,289 | * | 5/1998 | Nimura et al. ................. 701/209 X |
| 5,809,115 | | 9/1998 | Inkinen . |
| 5,902,349 | * | 5/1999 | Endo et al. ..................... 701/209 X |

FOREIGN PATENT DOCUMENTS

0575943A1   12/1993   (EP) .

* cited by examiner

Primary Examiner—Bernarr E. Gregory
(74) Attorney, Agent, or Firm—Perman & Green, LLP

(57) ABSTRACT

A vehicle navigation system calculates a route from a start point to a destination further determines alternative routes within a detour region. If the user of the navigation system has left the calculated route the navigation system suggests alternative routes for returning the vehicle to the suggested route within the detour region.

28 Claims, 2 Drawing Sheets

LOCAL NAVIGATION ALTERNATIVES

BACKGROUND OF THE INVENTION

The invention relates to vehicle navigation apparatus.

Vehicle navigation systems can be divided into two types, one that holds route information locally in the vehicle, and another in which the vehicle accesses a remote data base providing route information.

The second type of system has advantages. Whereas locally held information will become out of date and need to be up dated by each user at the respective local station, a central data base can be continually updated. A user will, accordingly have up-to-date information whenever it is required. Additionally a system in which route information is held locally must store all the information a user is likely to require. This is expensive in terms of memory and also route calculation time. In central information system, the user needs only send start and endpoint information and receive a suggested route from the central database. This requires less memory storage capacity, and is more versatile as route information can be kept current on a daily, hourly, or on a more frequent basis.

Centrally determined route guidance (CDRG) which only yields an optimal path suffers from a lack of route alternatives once the driver leaves the optimal path. If this happens accidentally the driver would like to have a recovery option, either a newly planned route or a return to the previously determined route. A quick corrective response of the route guidance system is often necessary which could be difficult for the optimal path CDRG due to latency in the planning time.

Problems occur with receiving route information from a central database when a driver deviates from the provided route. This could be accidental as a result of a navigation error or necessary because of an unforeseen route blockage. If a large region surrounding the suggested route is mapped, there is more tolerance to driving errors but there is also likely to be additional cost to the user in terms of terminal memory.

Current systems usually rely on local CD-ROM based route guidance software and are sold by several vendors (Bosch/Blaupunkt, Philips, Alpine, Siemens, Delco, Marelli). They are autonomous in the sense that they do not have to contact a service provider. But the CD_ROM database gradually becomes obsolete and usually contains too much information to the user and also indicates alternative routes.

SUMMARY OF THE INVENTION

In accordance with the present invention there is provided a vehicle navigation system comprising: a route calculator for providing a suggested route for a vehicle between journey start and end points, and for calculating, for selected positions in a detour region bordering the suggested route, respective detour routes for returning the vehicle to the suggested route; means for determining the selected position within the detour region closest to the vehicle; and means responsive to the means for determining for providing detour route guidance instructions for returning the vehicle to the suggested route.

The invention provides the advantage that, the memory required to hold data for an individual journey is relatively small, and that by providing information to return to a suggested journey at selected positions, the requirement for detailed information on all areas along the journey route is reduced.

The route calculator is preferably located remote from the vehicle and means is provided for loading the suggested route and detour routes into a processor travelling with the vehicle. This allows a centrally held data base to supply the route information. This has advantages in terms of relevance of information. It is easier for a single centrally located database to be kept updated.

The vehicle navigation system preferably provides a plurality of detour route choices for each selected position. This allows the user to select the most appropriate return route for the prevailing circumstances. Individual ones of the plurality of detour routes from a selected point can be given a priority or weighting based upon predetermined or user selectable criteria. This provides the option to select a detour route that provides for example, the quickest, shortest in distance or least congested return to the suggested route.

The vehicle navigation system may provide the route guidance instructions aurally or visually.

The vehicle navigation system could operate in response to user input information in order to determine the selected position closest to the vehicle. This could, however, be achieved automatically with an appropriate position sensing device. Such a device could use existing GPS information to locate specific points. This information could be supplemented with direction information from a direction sensor to provide information allowing the closest selected position in the direction of travel to be selected. In an automated system, the driver may be prompted to return to the suggested route. These instructions could be given without the driver needing to be aware of a departure from the suggested route. It may, however be advantageous to indicate to the driver that an error has been made in order to prompt more careful adherence to the instructions for the future.

The selected points are preferably regularly spread throughout a defined detour region, ideally each road intersection would be provided as a selected point. A new suggested route and selected point detour information is preferably calculated if the vehicle moves outside the detour region.

BRIEF DESCRIPTION OF THE DRAWINGS

The invention will now be described in greater detail with reference to the accompanying drawings of which.

DETAILED DESCRIPTION OF THE INVENTION

Figure 1:
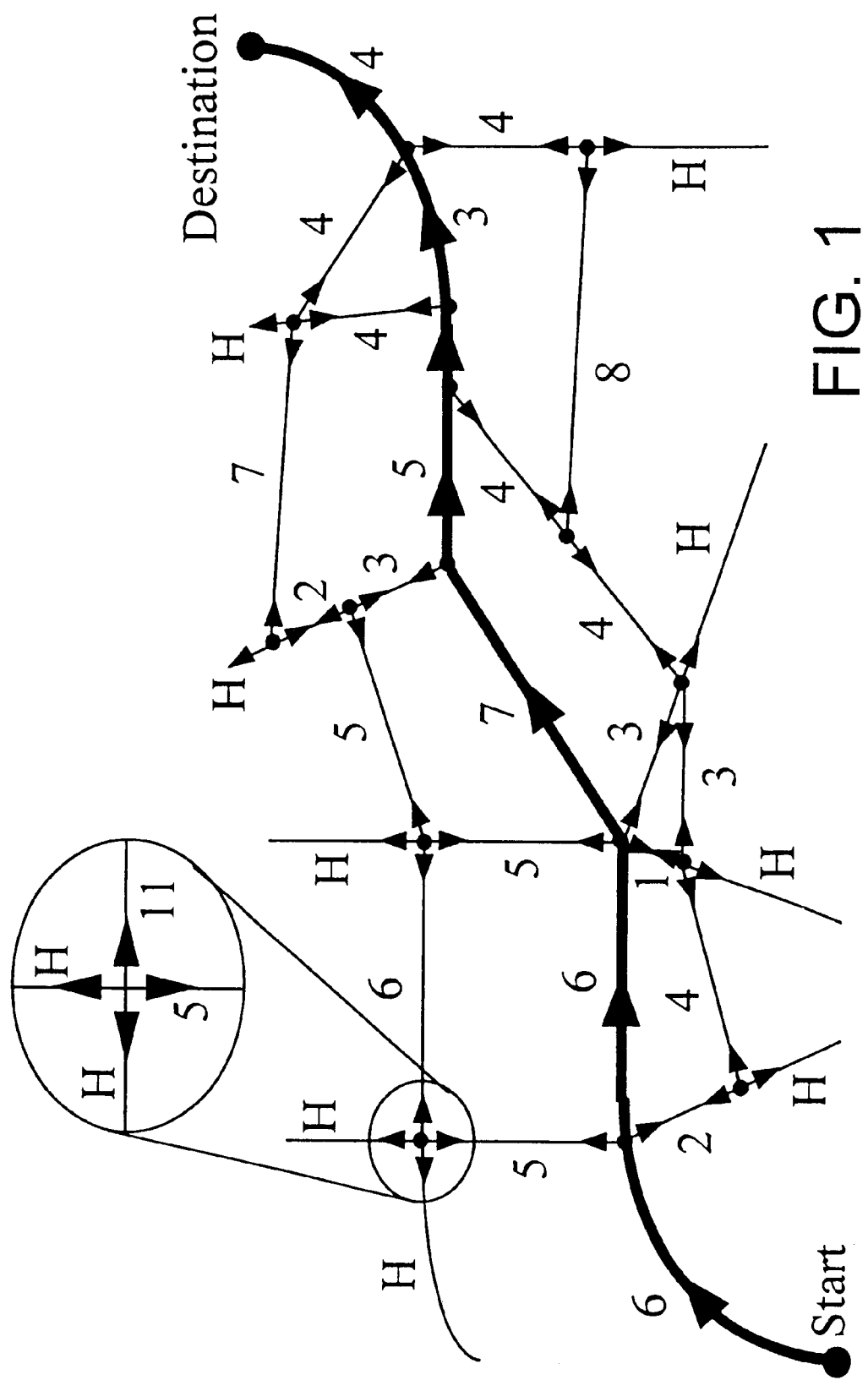
FIG. 1 shows a route map from a start point to a destination according to the invention

In order to use the benefits of CDRG versus a local route guidance via in-car maps and routing software (e.g. up-to-date information additional personal services) CDRG must provide a compromise between the extremes, namely optimal path CDRG and pure local path planning.

The concept of local route alternatives without an extensive terminal-based database and related routing software uses the optimal path from a starting point to a destination an "attractor" for less optimal, but feasible route alternatives: during the path planning process at the service provider an attractor region around the optimal path is defined. In this region all relevant detours from this path are labelled with guidance commands which lead back to the optimal path. The extent of this attractor region can be adjusted by the user. A larger region makes navigation more tolerant to driving errors, but requires more terminal memory and due to the higher planning effort at the service provider will probably be more expensive for the user.

Prerequisites for this variant of CDRG are a precise positioning system like (GPS), possibly in conduction with inertial car sensors which allow a resolution to distinguish between adjacent streets and to determine the driving direction. In addition a cellular data link for communication with a service provider is required.

For route planning the user enters a starting location (most likely the current position which can be retrieved from the GPS receiver) and the destination. Optionally the driver can add preferences for the street category he/she would like to use (e.g. highways as much as possible) and define the extent of a 'attractor region' around the optimal path to the destination. If the driver leaves the optimal path, but remains in the attractor region, the navigational terminal will be able to give a detour back to the optimal path. The larger the extent of the attractor region (perhaps measured in km around the optimal path) the greater is the complexity of the CDGR and thus very likely the price for the service.

In this concept every route is described in a graph structure with nodes and transitions linking two nodes. Each node represents a GPS position on the route and each transition contains two pieces of information, the driving direction in absolute angular co-ordinates and the total costs to return to from the current node to the optimal path. The term 'cost' is meant as an internal measure for the driving efforts, not as a fiscal amount. Each transition between two nodes means driving and therefore is associated with a certain partial cost. The total cost is the sum of all partial costs on the way back from the current node to a node on the optimal path.

An analogy should help to clarify the concept. Imagine a landscape with valleys and hills. The optimal path is the path of a ball which is found in the valley and is rolling downwards. If the ball accidentally leaves the optimal path it takes a detour which leads up a hill. The ball will attempt to come back to a state of minimum potential energy by rolling down into the direction of the negative height gradient ie in the direction of steepest descent. Of course it could end in a local valley, a local minimum where it gets stuck and can proceed no further. In order to prevent local minima occurring, a negative ramp from the starting point to the destination is added to the surface, So at every point the absolute value of the slope is greater than the maximum slope of the underlying surface. So at every point the absolute value of the gradient is greater than zero. The ball will always come back to the optimal path in the valley.

In the case of route guidance we are better off. The most important difference with respect to the potential landscape analogy is that due to the street structure only a finite set of possible paths exist. We have a finite set of nodes where the driver can decide to change the street (street crossings).

The service provider returns a list of GPS nodes on the optimal path and in the attractor region. In addition every possible driving direction i.e. every transition is specified in the absolute angular co-ordinates and by its total costs. The costs for driving on the optimal path are the smallest possible, every detour has higher costs. If the GPS receiver and the other car sensors provide position and driving direction the appropriate GPS node can be triggered and the system yields the driving command with the smallest total costs. The command can be presented as an acoustical message (e.g. 'turn to the left at the next crossing'), as graphical information (e.g. left arrow on a display) or could simply be no system output meaning that the user simply has to continue as before. The level of detail for these driving commands can be set by the user. The system could only be active at highway exits or also react if smaller street crossings are reached. The extent of the attractor region also determines the number of GPS nodes to be transferred from the service provider.

The cost of a transition between two nodes can be measured by a variety of criteria:
1. costs are proportional to the driving distance;
2. costs are proportional to the driving time;
3. costs are proportional to the probability of traffic jams (on certain highways typically)
4. costs are smallest if the streets have high sightseeing appeal (for tourists)

The criteria to be taken into account could be set, or prioritized by the user.

It is also conceivable to have a more complex cost function which is a weighted average of the individual cost criteria. The optimization criterion can be selected by the user. At a street crossing a complete 180° turn could be the shortest way back to the optimal path. If the user approaches such a crossing, the cost for driving in this reversed direction could be augmented by a 'punishment' cost component in order to discourage such driving behaviour. If a possible driving direction means leaving the attractor region, the total cost must be set very high. Then the system can detect that a new route planning process at the service provider needs to be initiated.

It is not necessary that the navigation terminal has to store a complete and connected graph. It is sufficient that every GPS node and its different transitions are stored separately since the system does not check whether two nodes are connected. It is important to note that the system only proposes driving directions on the resolution level chosen by the user. If the user only selects route guidance on highways, the system would be blind for accidentally leaving the highway and could not offer alternatives. On the other hand this offers the opportunity to direct the user only through the larger streets where it is easier to navigate.

The concept is demonstrated by a graphical example of the route guidance algorithm illustrated in FIG. 1.

Local navigation with an optimal path from starting point to destination marked bold. Alternative routes in an attractor region are also drawn. The numbers attached to path segments indicate their partial costs when the user travels along the path segment. Very high costs (e.g. leaving the attractor region) are marked by H. For an exemplary node at the upper left corner a zoomed view is sketched where the total costs (=sum of the path segment costs for the cheapest possible path which guides directly back to the optimal path) are given as labels for each driving direction.

As an alternative it would be possible to label a driving direction with the sum of all partial costs to the destination. This is advantageous if the costs of an alternative route through the attractor region to the destination, which does not use or only partially uses the optimal path are lower then the costs of driving directly back to the optimal path and follow the optimal path back to the destination.

The complete path planning including computation of partial costs for all path segments and total costs for the cheapest path back to the optimal path are handled at the service provider. The only processing required at the terminal is to detect GPS positions and driving directions and a simple decision for selecting the appropriate driving command with least total costs. Even if the user ignores the driving advice, the system will offer a new driving command at the next GPS position where it has information for the user.

The system provides a balance between pure autonomous local route planning and pure CDRG in order to offer route alternatives to the user instantaneously (without new central route planning), but with a limited regional extent. The implementation can be done efficiently without using too many system resources like memory or processing time.

Figure 2:
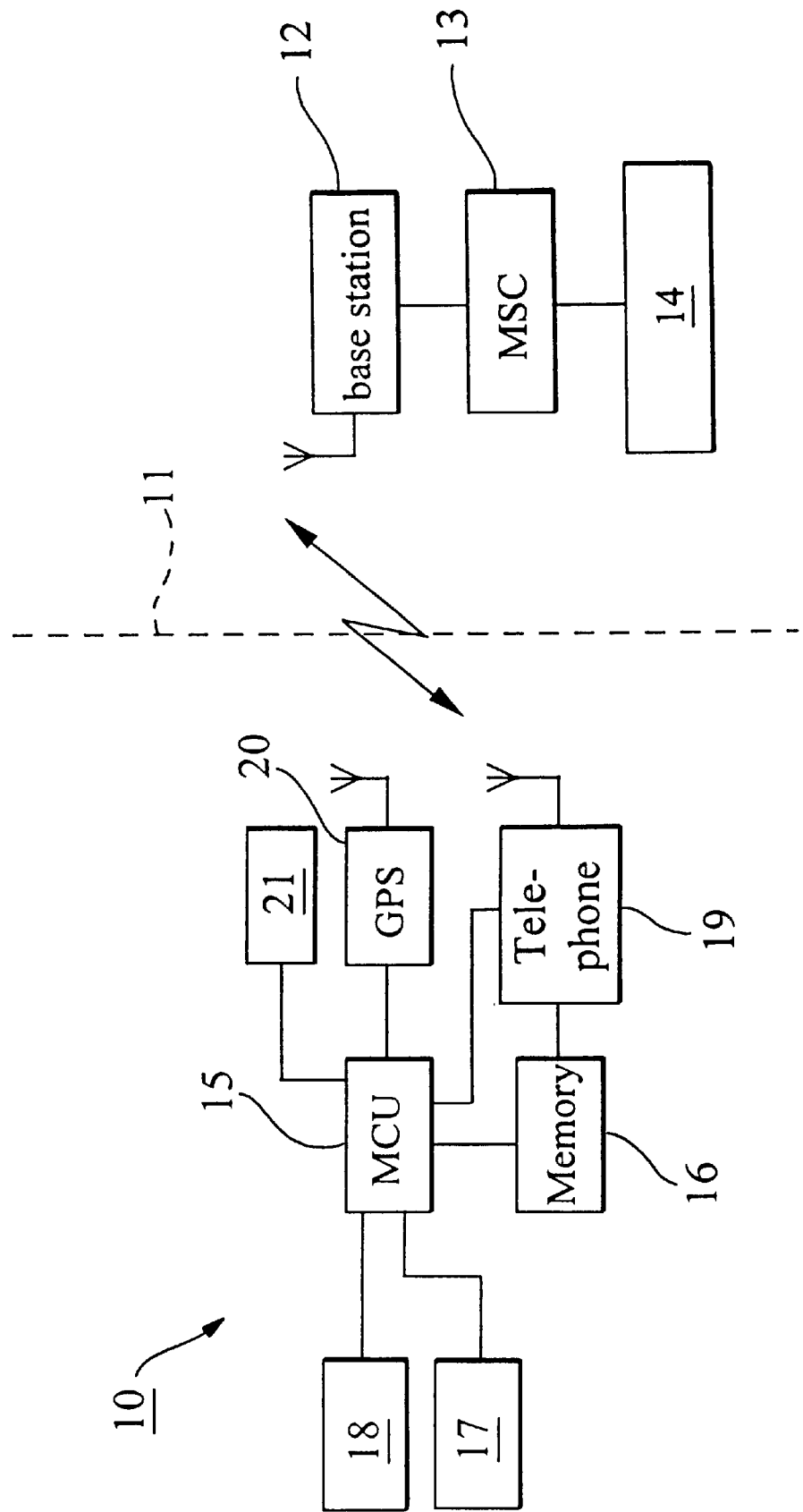
FIG. 2 shows a block diagram of a system to carry out the invention

A possible hardware realization of the navigation system is shown in FIG. 2. The vehicle navigation system comprises a Micro Controller Unit (MCU) 15. The MCU 15 receives commands from an input unit 18. The input unit 18 might comprise a keyboard and switches for controlling functions of the navigation system. This manually controlled devices can be located in the dashboard, the middle console of the car or on the steering wheel. For aural control the input unit 18 might further comprise a microphone and a speech recognition unit. The input unit 18 can be used to enter start and destination of the route.

Furthermore the MCU 15 is connected to an output unit 17 with a display for visual and a loudspeaker for aural route guidance instructions to the user.

The display can be used to display the route with the optimal path and the attractor region of FIG. 1.

The MCU 15 is further connected to a memory 16. Memory 16 is used to store the route with the optimal path and the attractor region which was received through the cellular telephone 19.

In order to determine the position of the vehicle the navigation system further comprises a positioning receiver 20 which receives satellite signal from the Global Positioning System (GPS). To improve the accuracy of the positioning also a dead reckoning unit 21, which can be connected to wheel sensors, speedometer and a gyro sensor for indicating the driving direction, is connected to MCU 15. The GPS positioning unit 20 can only provide a useful positioning signal if three or more GPS satellite signals are received. If, for example, no or not enough satellite signals are received while the vehicle is in a tunnel, the dead reckoning unit 21 provides the signals to follow up the position of the vehicle.

MCU 15 indicates through the output unit 17 visual and/or aural to the driver that the optimal path is left when a comparison of the actual position, determined by the positioning devices 20 or 21 and the optimal path indicates that the optimal path has been left.

After the driver has entered the start and destination points the MCU establishes a connection via the cellular telephone 19 through a base station 12 and a Mobile Switching Center (MSC) 13 to the service provider 14. Based on the start and destination information a route with the optimal path and the attractor region is calculated by the service provider 14. The service provider 14 transmitts the determined information through the cellular network to the navigation system 10 where the information is stored in memory 16.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A vehicle navigation system comprising:
   a data processor carried by a vehicle;
   a route calculator for providing a suggested route for the vehicle between journey start and end points, and for calculating, for selected positions in a detour region bordering the suggested route, respective detour routes for returning the vehicle to the suggested route, the route calculator being located remote from the vehicle;
   means for loading the suggested route and detour routes into the processor;
   means for determining the selected position within the detour region closest to the vehicle; and
   means responsive to the determining means for providing detour route guidance instructions for returning the vehicle to the suggested route.

2. A vehicle navigation system according to claim 1 wherein the route calculator is operative to provide a plurality of detour routes for each selected position.

3. A vehicle navigation system according to claim 2 wherein the route calculator is operative to prioritize the individual ones of the plurality of detour routes from a selected point.

4. A vehicle navigation system according to claim 3 wherein the individual detour routes are prioritized on the basis of predetermined criteria.

5. A vehicle navigation system according to claim 3 wherein the predetermined criteria are user selectable.

6. A vehicle navigation system according to claim 3 wherein the route guidance instructions for the detour route with the highest prioritization is provided.

7. A vehicle navigation system according to claim 3 wherein the selected points are located within the defined detour region.

8. A vehicle navigation system according to claim 1 wherein the route guidance instructions are aural.

9. A vehicle navigation system according to claim 1 wherein the route guidance instructions are visual.

10. A vehicle navigation system according to claim 1 wherein the means for determining the selected position is responsive to user input.

11. A vehicle navigation system according to claim 1 wherein the means for determining the selected position within the detour region comprises position sensing equipment.

12. A vehicle navigation system according to claim 11 wherein the position sensing equipment is responsive to GPS signals for determining the closest selected position.

13. A vehicle navigation system according to claim 12 further comprising a direction sensor indicating a direction of travel of the vehicle, wherein the sensing equipment is further responsive to input from the direction sensor indicating the direction of travel of the vehicle.

14. A vehicle navigation system according to claim 13 wherein the processor is adapted to determine the closest selected position in the direction of travel and provide route guidance instruction from that selected position.

15. A vehicle navigation system according to claim 11 wherein the processor is adapted to indicate to the driver that the suggested route has been left.

16. A vehicle navigation system according to claim 1 wherein further information can be sent from the remote route calculator if the vehicle moves beyond the detour region.

17. A vehicle navigation system according to claim 1 wherein the scope of the detour region can be selected by the user.

18. A vehicle navigation system according to claim 1 wherein the type of route of preference can be specified for the suggested route.

19. A vehicle navigation system according to claim 1 wherein the scope of the detour region can be dependent on the type of route being specified.

20. A vehicle navigation system according to claim 19 wherein the selected points are road intersections.

21. A vehicle navigation system according to claim 1 wherein if the car exits the detour region, a new suggested route is requested from the central database.

22. A method for vehicle navigation comprising:

locating a data processor in a vehicle;

locating a route calculator remote from the vehicle;

calculating by the route calculator a suggested route for the vehicle between journey start and end points;

calculating by the route calculator, for selected positions in a detour region bordering the suggested route wherein the vehicle may travel into the detour region, respective detour routes for returning the vehicle to the suggested route;

loading the suggested route and detour routes into the processor;

determining by the data processor the selected position within the detour region closest to the vehicle; and providing detour route guidance instructions for returning the vehicle to the suggested route.

23. A vehicle navigation system comprising:

a data processor carried by a vehicle;

a route calculator for providing a suggested route for the vehicle between journey start and end points, and for calculating, for selected positions in a detour region bordering the suggested route, respective a communication link interconnecting the route calculator with the data processor for loading the suggested route and detour routes from the route calculator into the processor;

equipment for sensing position of the vehicle, wherein the data processor determines a selected position of the vehicle within the detour region closest to the vehicle, based on position information of the position sensing equipment; and the data processor provides detour route guidance instructions for returning the vehicle to the suggested route.

24. A vehicle navigation system according to claim 23 wherein the position sensing equipment comprises dead reckoning equipment carried by the vehicle.

25. A vehicle navigation system according to claim 24 wherein the position sensing equipment further comprises a GPS, global positioning system, receiver carried by the vehicle.

26. A vehicle navigation system according to claim 23 wherein the position sensing equipment comprises a GPS, global positioning system, receiver carried by the vehicle.

27. A vehicle navigation system comprising:

a data processor and vehicular position sensing equipment carried by a vehicle;

a route calculator located remote from the vehicle, the route calculator providing a suggested route for the vehicle between journey start and end points, and wherein the route calculator calculates, for selected positions in a detour region bordering the suggested route, respective detour routes for returning the vehicle to the suggested route, calculations of the route calculator being based on travel information available to the route calculator but unavailable at the vehicle;

a communication link interconnecting the route calculator with the data processor for loading the suggested route and detour routes from the route calculator into the processor;

wherein the data processor determines a selected position of the vehicle within a detour region closest to the vehicle, based on position information of the position sensing equipment; and the data processor provides detour route guidance instructions for returning the vehicle to the suggested route, based on route data from the route calculator.

28. A vehicle navigation system according to claim 27 wherein individual ones of the plurality of detour routes from a selected point are prioritized on the basis of predetermined criteria, and wherein an input to the data processor enables user selection of the criteria.

* * * * *

UNITED STATES PATENT AND TRADEMARK OFFICE
CERTIFICATE OF CORRECTION

PATENT NO.    : 6,298,304 B1
DATED         : October 2, 2001
INVENTOR(S)   : Theimer It is certified that error appears in the above-identified patent and that said Letters Patent is hereby corrected as shown below:

<u>Column 7,</u>
Line 27, insert -- detour routes for returning the vehicle to the suggested route, the route calculator being located remote from the vehicle; -- after respective.

Signed and Sealed this

Eleventh Day of June, 2002

Attest:

JAMES E. ROGAN
Attesting Officer          Director of the United States Patent and Trademark Office